United States Patent Office 3,388,103
Patented June 11, 1968

3,388,103
THERMOPLASTIC POLYUREAS PREPARED FROM ARALIPHATIC DIAMINES
Wolfgang Imöhl, Unna, and Peter Borner, Altlunen, Germany, assignors to Schering Aktiengesellschaft, Berlin, Germany
No Drawing. Filed July 19, 1966, Ser. No. 566,252
Claims priority, application Germany, July 28, 1965, Sch 37,452
2 Claims. (Cl. 260—77.5)

ABSTRACT OF THE DISCLOSURE

New thermoplastic copolyureas are prepared by simultaneous condensation of (1) an aryl aliphatic diamine, (2) an alkylene diamine and (3) a urea or derivative thereof, by heating a mixture of these reactant components to temperatures increasing up to 240° C. and subsequent vacuum. The araliphatic diamines have alkyl-substituents in the aromatic nucleus; the alkylene diamines having in the chain 4–18 carbon atoms and/or diamines branched in the carbon chain and having 9 to 19 carbon atoms, and/or diamines having 8–11 carbon atoms and being interrupted by oxygen atoms in the chain. The utility of said new copolyureas is based on their easy preparation and the favorable combination of their properties, including easy workability and favorable physical properties. In carrying out the invention instead of urea its derivatives, or $CO_2$ or $COCl_2$ can be used.

---

Aromatic diamines have been used previously for producing polyureas. These polymers, which were produced by reacting diisocyanates with diamines, were in most cases brittle and high-melting products which could not be used for practical purposes. Such products are described, for example, in U.S. Patent No. 2,292,443. Furthermore, xylylenediamines were also reacted with diisocyanates to form polyureas.

In the preparation of polyureas from diisocyanates and diamines, by direct action of the reaction components upon each other, largely branched or cross-linked polyureas are obtained. Only in the presence of solvents or with the aid of interface polycondensation, is it possible to conduct the reaction in such manner that mainly linear polyureas are formed. Polycondensation of diamines with urea or urea compounds, which has been known for a long time, is an essentially simpler process and, therefore, more advantageous.

However, co-condensation products prepared from aryl-aliphatic diamines, e.g., xylylenediamine or bis-aminoethylbenzol, with aliphatic diamines and urea, are not satisfactory yet as far as the conditions of their preparation and processing are concerned. For example, the possibilities of preparation in co-condensation with urea, are limited to specific mixing proportions of the diamines. Moreover, due to their high melting points, the resulting products have an unfavorably narrow processing range between the melting and decomposition temperature and their characteristics are not satisfactory in other respects.

It has now been surprisingly found that aryl-aliphatic diamines which have at least one alkyl group at the aromatic nucleus, are particularly suitable for the preparation of copolymers and, moreover, the co-polymers prepared therefrom are distinguished, by a favorable combination of outstanding characteristics.

The present invention relates to a process for preparing thermoplastic polyureas by co-condensation of (1) aliphatic straight-chained diamines having 4–18 carbon atoms in the chain; and/or aliphatic diamines branched in the carbon chain, and/or aliphatic diamines, the carbon chain of which is interrupted by oxygen atoms; (2) aryl-aliphatic diamines; and (3) of polyurea-forming compounds, i.e. urea, urea compounds, phosgene, carbon dioxide, carbon dioxide esters. Said process is characterized by the use of aryl-aliphatic diamine compounds of the general Formulas I and II:

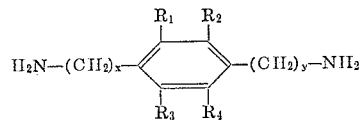

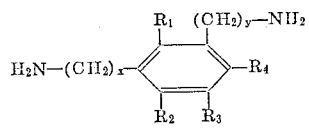

wherein $x$ and $y$ are integers of 1 to 6 and $R_1$, $R_2$, $R_3$, $R_4$ stand each for hydrogen or an alkyl group having not more than 6 carbon atoms and at least one of $R_1$, $R_2$, $R_3$, $R_4$ is an alkyl group.

The present invention further relates to new thermoplastic copolyureas essentially consisting of a plurality of units repeating themselves, said units having the general Formulas III and IV

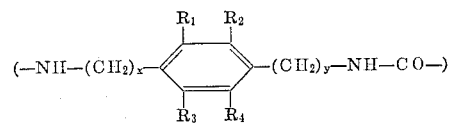

$$(-NH-R_5-NH-CO-) \quad \text{IV}$$

wherein $x$ and $y$ are integers of 1–6 and the radical $-(CH_2)_y-NH-CO-$ is in a position selected from the meta- or para-positions relative to the radical $(CH_2)_x$; each of $R_1$, $R_2$, $R_3$, $R_4$ are selected from the group consisting of H and alkyl groups containing not more than 6 carbon atoms, at least one of $R_1$, $R_2$, $R_3$, $R_4$ being an alkyl group and $R_5$ is selected from the group consisting of linear alkylene radicals having 4–18 carbon atoms, and alkylene radicals which carry a substituent selected from the group consisting of at least one alkyl substituent, middle size alkyl substituents and higher alkyl substituents and alkylene radicals the carbon chains of which are interrupted by oxygen radicals.

The present invention further relates to new thermoplastic copolyureas as described above containing additional units of the general Formula V $$(-NH-R_6-NH-CO-) \quad \text{V}$$

wherein $R_6$ has the same meanings as $R_5$.

Examples of diamines suitable for use according to this invention are: 2,4-bis - aminomethyl-toluene, 2,5-bis-aminomethyl-p-xylene, bis-aminomethyl-durene, 2,4-bis-aminoethyl-1,3,5-triisopropylbenzene, which can be prepared according to U.S. Patent No. 2,640,080, 2,4-bis-aminoethyl-toluene, 2,5-bis - aminoethyl-p-xylene, bis-aminoethyl-m-xylene, bis - aminoethyl-durene, 2,5-bis-aminoethyl-p-diethylbenzene, 2,4-bis - aminoethyl-1,3,5-triisopropylbenzol, which can be prepared by causing to react the corresponding bis-chloromethyl compounds with alcali cyanide and subsequent hydrogenation of the resulting dinitriles, 1,4-bis-aminopropyl-tetrabutyl-benzene, 1-aminopropyl-4-aminoethyl-durene, 1,4-bis-aminohexyl-durene, which are obtainable according to U.S. Patent No. 2,891,088.

Suitable as co-components are aliphatic, straight-chained diamines having a carbon atom number of 4–18, such as, for example, tetra-, hexa-, octa-, nona-, dodeca-methylene-diamine, and/or branched-chained aliphatic diamines, such as 9- or 10-aminomethyl-stearylamine, 2,2,4- or 2,4,4-trimethyl-hexamethylene-diamine, 1,6-diamino-2,5-diethylhexane, 1,8 - diamino-2-ethyloctane, or aliphatic diamines, the carbon chain of which is interrupted by oxygen, such as, for example, 1,2-bis-(aminopropoxy)-ethane, 1,3-bis-(3-aminopropoxy)-propane, 2,2-dimethyl-1,3-bis-(3-aminopropoxy)-propane.

In preparing polyureas embodying this invention, cocondensation of the diamine components with urea or urea compounds is preferred. As urea compounds, the reaction products of diamines with one or two mols urea, i.e., the w-aminoalkylene ureas, or the w,w'-diureido compounds of the diamines or their mixtures, can be used.

Furthermore, the products embodying this invention can be also prepared by reaction of the diamine components with carbon dioxide, under pressure and continuous or stepwise removal of the reaction water formed, or with carbonic acid alkyl- or phenyl-esters. Preparation of the polycondensates according to the polycondensation, known per se, of diamines with phosgene, is likewise possible.

It has been found particularly advantageous to carry out the process of the invention by polycondensation of a mixture of amines with urea and a viscosity stabilizer. Thereby the reaction mixture is caused to react in a vessel with a stirrer in a protecting atmosphere of gas, e.g. nitrogen, at 120–140° C., $NH_3$ being split off thereby. Subsequently, a second condensation phase at 180–250° C. and a third phase with the application of vacuum, follow. Furthermore, the reaction can be carried out in solvents, e.g. m-cresol, or only the first phase of condensation is carried out in a solvent, e.g. water.

In order to attain certain specific reproducible characteristics, it is of advantage to apply—in a manner known per se—viscosity stabilizing compounds in the preparation of polyureas embodying this invention. In conventional manner, difficultly volatile monofunctional compounds, such as, for example, β-naphthalenesulfonic acid, stearic acid, N-pelargonylnonamethylene diamine etc. Stearic acid hydrazide has also been suggested as viscosity stabilizing agent.

As suggested above, the presence of phenylene-groupings in a polyurea chain results in most cases either in such high melting ranges of the pre-polymers that further condensation is not possible, or in a melting range of the polymer which is higher than the critical processing temperature for polyureas. Thus, p-xylylene diamine can be condensed to homogeneous, high molecular polyureas only in the presence of a large proportion of another diamine, such as, for example, nonamethylenediamine. Likewise, in the case of 1,4-bis-aminoethyl-benzol—which contains two more $CH_2$ groups—a molecular ratio of nonamethylenediamine:1,4-bis - aminoethyl-benzol=3:1 is necessary for obtaining useful products.

These difficulties of preparation and processing are eliminated if in the condensation process aryl-aliphatic diamines, which are alkyl-substituted at the aromatic nucleus, are used. For copolymerization it is only necessary then to add also small amounts of another diamine, such as, for example, nonamethylene diamine, in order to arrive by a simple condensation process at products which can be well processed and have a high content of the aryl-aliphatic component (see Table I).

TABLE I
[Possibility of preparing polyureas with varying ratios of comonomers by condensation of diamine with urea]

| Molar ratio C9:x | 5:1 | 4:1 | 3:1 | 2:1 | 1:1 |
|---|---|---|---|---|---|
| x=BAT | + | + | + | + | + |
| x=BAX | + | + | + | + | + |
| x=BMB | + | + | − | − | − |
| x=BAB | + | + | + | − | − |

BAT=2,4-bis-aminoethyl-toluene.
BAX=2,5-bis-aminoethyl-p-xylene.
BMB=Bis-aminomethyl-benzene.
BAB=Bis-aminoethyl-benzene.
+Preparation possible.
−Preparation not possible.

In addition to the above mentioned advantages of the mode of preparation, the polyureas prepared with diamines according to this invention, have also superior mechanical characteristics.

In purely aliphatic polyureas, in which the unfavorably narrow range of processing, between melting and decomposition temperatures, is enlarged by suitable co-condensates—for example by the simultaneous use of suitable aliphatic, branched diamines and/or aliphatic diamines, the chains of which are interrupted by heteroatoms, simultaneously a relatively considerable cold flow, a low yield stress, high breaking elongation and a relatively low second order transition temperature, must be accepted.

These disadvantages are not present in polyureas prepared according to the process of this invention. These polyureas are distinguished by a surprisingly favorable combination of good transparency, high mechanical strength, high stiffness, low value of cold flow and excellent behavior to stress by impact. In addition, the use according to the invention of aryl-aliphatic diamines which are alkylated at the aromatic nucleus, results in an essentially higher increase of the second order transition temperature in the co-polyureas in comparison with corresponding diamines which are not alkyl-substituted (see Table II). The higher second order transition temperature improves the retention of shape and increases the possibility of uses of articles made therefrom, at higher temperatures.

TABLE II
[Mol-ratio of nonamethylenediamine:urea:X=3:4:1]

| X | Melting Range, ° C. | Second Order Transition Temperature, ° C. |
|---|---|---|
| 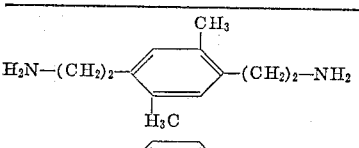 | 195–205 | 70 |
|  | 235–245 | 58 |

The extremely favorable influence on the melting ranges of the polycondensates by the diamines according to this invention, is likewise shown in Table II.

The following examples describe the details of the process according to this invention, to which the invention is not limited. The relative solution viscosity was determined in 1% m-cresol solution at 20° C.; the second order transition temperature was determined from the temperature-dependence of the torsion modulus of quenched foils according to DIN 53445; the resistance to tearing (or tensile strength) was determined in standard bars ST III according to DIN 53504 at a tearing velocity of 100 mm./minute likewise in quenched foils. The impact strength (notched) was determined in standard bars with a U-notch of 0.6 mm. according to DIN 53453.

Example 1

413 g. nonamethylenediamine (amine number 707), 500 g. 2,5-bis-amino-ethyl-p-xylene (amine number 582) (mol ratio 1:1), 312.5 g. urea and 15.8 g. stearic acid hydrazide, are heated in a pure nitrogen atmosphere under stirring for 3 hours at 130° C. Subsequently, the temperature is increased to 240° C. After further heating for 35 minutes at 240° C. a slowly increasing vacuum (2 torr after 75 minutes) is applied. The squeezed condensate is colorless and transparent; the relative solution viscosity η rel amounts to 2.22. The melting range is at 200–205° C. The yield stress amounts to 700 kg./cm.$^2$ and the impact strength (notched) is 20 kgcm./cm.$^2$. The second order transition temperature is at 95–100° C.

Example 2

400 g. nonamethylenediamine (amine number 709), 243 g. 4,6-bis-aminoethyl-m-xylene (amine number 582) (mol ratio 2:1) and 7.95 g. stearic acid hydrazide are heated with 228 g. urea in a pure nitrogen atmosphere under stirring for 3 hours to 130° C. Subsequently, during a period of 45 minutes, the temperature is increased to 240° C. After further heating (for 20 minutes) at 240° C., slowly increasing vacuum is applied (2 torr after 45 minutes). The squeezed polycondensate is colorless and transparent; its solution viscosity, $\eta$ rel amounts to 5.1; the melting viscosity is 198–202° C.

Example 3

In a manner analogous to that described in Example 2, the following reactants are polycondensed: 550 g. nonamethylene diamine (amine number 709), 334 g. 2,5-bis-amino-ethyl-p-xylene (amine number 582) (mol ratio 2:1) and 15.4 g. stearic acid hydrazide and 313 g. of urea. A transparent product having a melting range of 190–195° C. is thus obtained which has a solution viscosity $\eta$ rel of 2.6. Its impact strength (notched) amounts to 28 kg./cm.$^2$. The second order transition temperature is at 85–90° C.

Example 4

In a manner analogous to that described in Example 3, the following components are polycondensed: 400 g. nonamethylene diamine (amine number 709), 121.5 g. 4,6-bis-aminoethyl-m-xylene (amine number 582), 121.5 g. 2,5-bis-amino-ethyl-p-xylene (amine number 582) (mol ratio 2:1/2:1/2), 228 g. urea and 7.85 g. stearic acid hydrazide. A transparent, colorless product having a melting range of 195–199° C., and a solution viscosity $\eta$ rel amounting to 4.4 is obtained. The yield stress amounts to 640 kg./cm.$^2$.

Example 5

14 g. nonamethylene diamine (amine number 709), 5.34 g. 2,4-bis-amino-ethyl-toluene (amine number 620) (mol ratio 3:1) and 7.09 g. urea and 0.214 g. stearic acid are heated for 90 minutes at 130° C. Then, in 15 minutes the temperature of 130° C. is increased to 240° C. After further heating (45 minutes) at 240° C. a slowly increasing vacuum is applied, so that after 75 minutes a vacuum of 2 torr is obtained. The colorless, transparent polycondensate has a melting range of 196–203° C. and a solution viscosity of $\eta$ rel=3.9. The yield stress amounts to 560 kg./cm.$^2$.

Example 6

In a manner analogous to that described in Example 5, the following components are polycondensed:
14 g. octamethylene diamine (amine number 778), 6.2 g. 2,5-bis-amino-ethyl-p-xylene (amine number 582) (mol ratio 3:1), 7.77 g. urea and 0.226 g. stearic acid.

A transparent product having a melting range of 220–229° C., and a solution viscosity amounting to $\eta$ rel of 3.3 is obtained.

Example 7

In a manner analogous to that described in Example 5, the following reactants were polycondensed:
14 g. decamethylene diamine (amine number 651), 5.2 g. 2,5-bis-amino-ethyl-p-xylene (amine number 582) (mol ratio 3:1), 6.5 g. urea and 0.211 g. stearic acid.

A transparent product having a melting range of 205–215° C. is thus obtained. The solution viscosity amounts to $\eta$ rel of 2.2.

Example 8

In a manner analogous to that described in Example 5, the following reactants were polycondensed:
15 g. dodecamethylene diamine (amine number 560), 4.8 g. 2,5-bis-amino-ethyl-p-xylene (amine number 582) (mol ratio 3:1), 6 g. urea and 0.215 g. stearic acid.

A transparent product having a melting range of 195–203° C. is obtained.

Example 9

In a manner analogous to that described in Example 5, the following reactants were condensed:
7.03 g. 2,5-bis-aminoethyl-p-xylene (amine number 580), 12.82 g. 1,2-bis-aminopropoxy-ethane (amine number 636) (mol ratio 1:2), 6.56 g. urea and 0.217 g. stearic acid.

A transparent product having a solution viscosity $\eta$rel amounting to 1.90 was obtained.

Example 10

In the manner analogous to that described in Example 5, the following reactants were polycondensed:
6.45 g. 2,5-bis-aminoethyl-p-xylene (amine number 580), 10.0 g. of a mixture of 9- and 10-aminomethyl-stearylamine (amine number 376), 5.31 g. of a mixture of 2,2,4- and 2,4,4-trimethylhexamethylenediamine (mol ratio 1:1:1), 6.04 g. urea and 0.233 g. stearic acid.

A transparent product having a melting range of 168–176° C. and a solution viscosity $\eta$rel amounting to 1.95 was obtained.

Example 11

10.9 g. hexamethylenediamine (amine number 965), 5.0 g. nonamethylene diamine (amine number 700), 6.08 g. bis-aminoethyl-p-xylene (amine number 574) (mol ratio 3:1:1) and 9.38 g. urea, as well as 0.249 g. stearic acid, were heated in an inert gas atmosphere for 110 minutes to 130° C. In 13 minutes the temperature of the reaction mixture was increased to 180° C. and the reaction mixture was maintained at this temperature for 17 minutes. After further heating at 240° C. (for 40 minutes) a slowly increasing vacuum was applied so that after 60 minutes a vacuum of 2 torr was obtained. The resulting transparent product has a melting range of 225–230° C. and a solution viscosity $\eta$rel amounting to 2.46.

Example 12

160 g. nonamethylenediamine (amine number 709), 97.3 g. 2,5-bis-aminoethyl-p-xylene (amine number 582) (mol ratio 2:1) and 2.55 g. stearic acid hydrazide, were introduced in a nitrogen atmosphere into an autoclave provided with stirrer. After application of $CO_2$-pressure of 175 atmospheres (above the normal atmospheric pressure), the raction mixture is heated to a temperature of 220–230° C. in 90 minutes; thereby the pressure increases to 300 atmospheres (above normal atmospheric pressure). The reaction in the autoclave is continued for 17 hours at 220–230° C. and said pressure of 300 atmospheres. During this reaction, the water formed by the reaction is removed by slightly opening the discharge valve and correspondingly opening the $CO_2$-feed valve so that a weak, continuous $CO_2$-current is passed through the autoclave, thereby maintaining said pressure of 300 atmospheres.

After relieving the autoclave from tension, under continued stirring at 220–230° C. within 30 minutes a vacuum of 2 mm. Mercury is applied and maintained for 50 minutes. After ventilating the autoclave with nitrogen, a colorless co-polyurea can be obtained by squeezing, which has a second order transition temperature of 80–85° C. and a yield stress of 600 kg./cm.$^2$.

Example 13

105.3 g. nonamethylene diamine (amine number 709) and 64 g. 2,5-bis-aminoethyl-p-xylene (amine number 583) are dissolved in 3 liter benzene. Furthermore, 100.8 g. liquid phosgene are dissolved in 0.6 liter toluene and 83.2 g. NaOH in 3 liter water. The solutions of the amines in benzene, of the phosgene in toluene and of the NaOH in water (mol-ratio 1:1.02:2.08) are uniformly introduced with very strong stirring dropwise in the volume ratio 5:1:5 into a reaction vessel which is cooled from the outside. At first a solvent mixture of benzene/toluene/water is placed in the reaction vessel in the volume ratio 5:1:5. During said dropwise introduction, the temperature of the entire solution is kept at 15–20° C. by intensive cooling. Polyurea is formed by the reaction and precipitates as a white powder. It is separated from the solvent mixture by centrifuging, washed several times with benzene and dried. The dried product is treated with steam and heated with a sodium carbonate solution on the water bath for one hour, filtered with suction and washed. A white, pulverulent polyurea is thus obtained, which has a relative solution-viscosity of 1.5 in 1% solution in concentrated sulfuric acid.

Example 14

6 g. nonamethylene diamine (amine number 709), 3.65 g. 2,5-bis-amino-ethyl-p-xylene (amine number 583) and 12.2 g. diphenylcarbonate are heated with 0.12 g. stearylamine in a reaction vessel under nitrogen to 200° C. After heating to 200°, 220° and 240° C. for ½ hour at each of these temperatures, a slowly increasing vacuum is applied. The phenol split off during the reaction is distilled off.

The polyurea thus prepared is subsequently treated with ethylalcohol in order to remove the last traces of phenol.

Example 15

13.1 g. of the diureido derivative of nonamethylenediamine, 10.3 g. 2,5-bis-aminoethyl-p-xylene and 0.22 g. stearic acid are heated under stirring in a nitrogen atmosphere to 240° C. After continued heating for 60 minutes at 240° C. a slowly increasing vacuum (2 torr after 75 minutes) is applied. A transparent polyurea is thus obtained, which has a solution-viscosity $\eta rel = 2.2$.

The abbreviation DIN stands for "Deutsche Industrie-Norm." The aminomethylstearylamine used in Example 10, contains 50% of the 9-derivative and 50% of the 10-derivative; the trimethylhexamethylenediamine used in said example contains 50% of the 2,2,4-derivative and 50% of the 2,4,4-derivative. The parts and percent described herein are by weight if not otherwise stated. In determining the impact strength (notched) a pendulum impact testing machine (0.1 DIN 51222) with a U-notch of 0.6 mm. was used.

What is claimed is:

1. Thermoplastic co-polyureas having a relative solution viscosity as determined in a 1% solution of m-cresol at 20° C. of between 1.9 and 5.1 and being prepared by co-condensing in a first condensation step at 120° C. to 140° C., a second condensation step at 180° C. to 250° C., and a third condensation step at 180° C. to 250° C. under vacuum, a mixture of the following components:

(A) an arylaliphatic diamine selected from the group consisting of compounds corresponding to one of the general formulae:

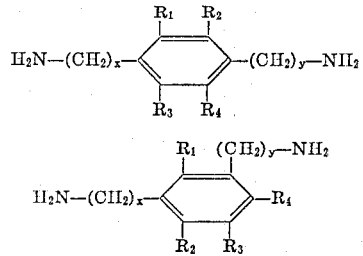

in which $x$ and $y$ stand for integers of from 1 to 6 and where $R_1$, $R_2$, $R_3$, and $R_4$ are selected from the group consisting of hydrogen and alkyl radicals containing not more than 6 carbon atoms, at least one of $R_1$, $R_2$, $R_3$, and $R_4$ being an alkyl group;

(B) a diamine selected from the group consisting of (i) aliphatic straight chain diamines having in the chain 4 to 18 carbon atoms, (ii) aliphatic diamines being branched in the carbon chain and having from 9 to 19 carbon atoms, and (iii) aliphatic diamines having from 8 to 11 carbon atoms in which the carbon chain is interrupted by oxygen atoms; and (C) a material selected from the group consisting of (i) urea, (ii) a w-aminoalkylene-urea compound, and (iii) a w,w'-diureido compound.

2. The co-polyureas of claim 1 wherein (A) is selected from the group consisting of (1) 2,5-bis-aminoethyl-p-xylene, (2) 2,6-bis-aminoethyl-m-xylene, and (3) 2,4-bis-aminoethyl-toluene.

References Cited

UNITED STATES PATENTS

| | | | |
|---|---|---|---|
| 2,292,443 | 8/1942 | Hanford | 260—77.5 |
| 3,046,254 | 7/1962 | Inaba et al. | 260—77.5 |
| 3,054,777 | 9/1962 | Inaba et al. | 260—77.5 |
| 3,119,793 | 1/1964 | Inaba et al. | 260—77.5 |
| 3,133,897 | 5/1964 | Inaba et al. | 260—45.85 |
| 3,185,656 | 5/1965 | Gabler et al. | 260—30.2 |
| 3,223,682 | 12/1965 | Gabler et al. | 260—77.5 |
| 3,248,424 | 4/1966 | Muller et al. | 250—553 |

DONALD E. CZAJA, *Primary Examiner.*

LEON J. BERCOVITZ, *Examiner.*

F. McKELVEY, *Assistant Examiner.*